(12) United States Patent
Takahashi et al.

(10) Patent No.: US 7,901,833 B2
(45) Date of Patent: Mar. 8, 2011

(54) FUEL CARTRIDGE FOR FUEL CELLS, FUEL CELL, FUEL CELL POWER SYSTEM AND METHOD OF MOUNTING A FUEL CELL CARTRIDGE ON A FUEL CELL

(75) Inventors: Ken Takahashi, Sagamihara (JP); Mitsugu Nakabaru, Hitachi (JP); Akira Tanaka, Mito (JP); Osamu Kubota, Hitachi (JP); Shinsuke Andoh, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 811 days.

(21) Appl. No.: 11/206,950

(22) Filed: Aug. 19, 2005

(65) Prior Publication Data

US 2006/0078770 A1 Apr. 13, 2006

(30) Foreign Application Priority Data

Oct. 8, 2004 (JP) .................................. 2004-295809

(51) Int. Cl.
*H01M 8/04* (2006.01)
(52) U.S. Cl. .......................................... 429/515; 429/513
(58) Field of Classification Search .................. None
See application file for complete search history.

(56) References Cited

U.S. PATENT DOCUMENTS 6,924,054 B2   8/2005  Prasad et al.
7,128,106 B2 * 10/2006  Becerra et al. ............... 141/349
7,645,536 B2   1/2010  Akiyama et al.
2004/0265652 A1 * 12/2004  Soucy .............................. 429/13
2008/0193823 A1   8/2008  Kanno

FOREIGN PATENT DOCUMENTS

| JP | 2003-045468 | 2/2003 |
| JP | 2003-142135 | 5/2003 |
| JP | 2006-54055 | 2/2006 |
| WO | WO 2005/057703 | 6/2005 |

OTHER PUBLICATIONS

JP Office Action of Appln. No. 2004-295809 dated Aug. 3, 2010 with partial translation.

* cited by examiner

*Primary Examiner* — Dah-Wei D Yuan
*Assistant Examiner* — Steven Scully
(74) *Attorney, Agent, or Firm* — Antonelli, Terry, Stout & Kraus, LLP.

(57) ABSTRACT

The present invention aims at providing a fuel cell and a fuel cartridge in which a fuel contained in the fuel cartridge is determined to be appropriate for the fuel cell or not, and when it is appropriate, the connection of the fuel cartridge is mechanically made possible. A fuel cartridge for a fuel cell is provided with a specific member for distinguishing the methanol concentration of a contained methanol solution fuel according to the methanol concentration. Further, a fuel cell is provided with a concentration recognizing member for determining whether the member for distinguishing the fuel concentration provided at the fuel cartridge is the one for a desired concentration.

12 Claims, 11 Drawing Sheets

FIG. 5a
FIG. 5b
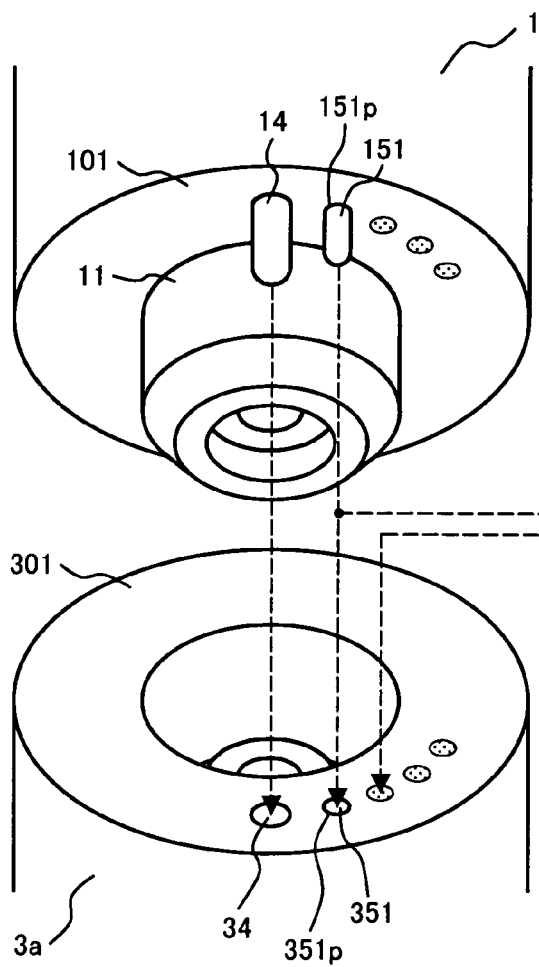
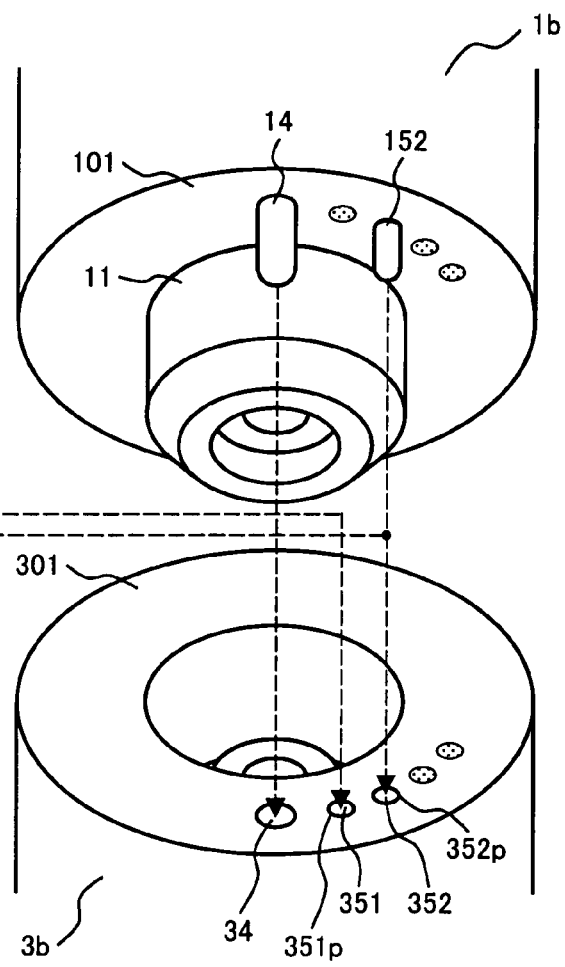

FIG. 8a
FIG. 8b
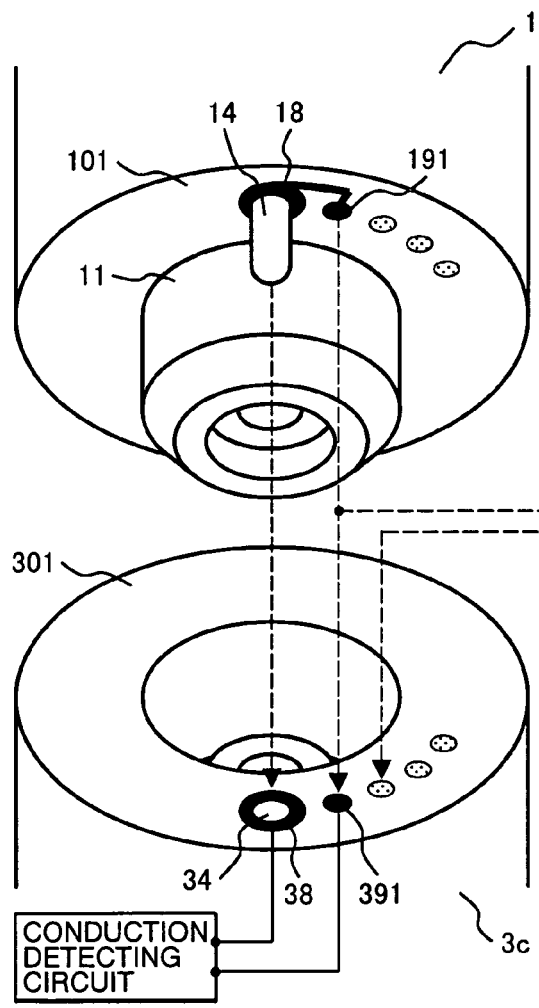
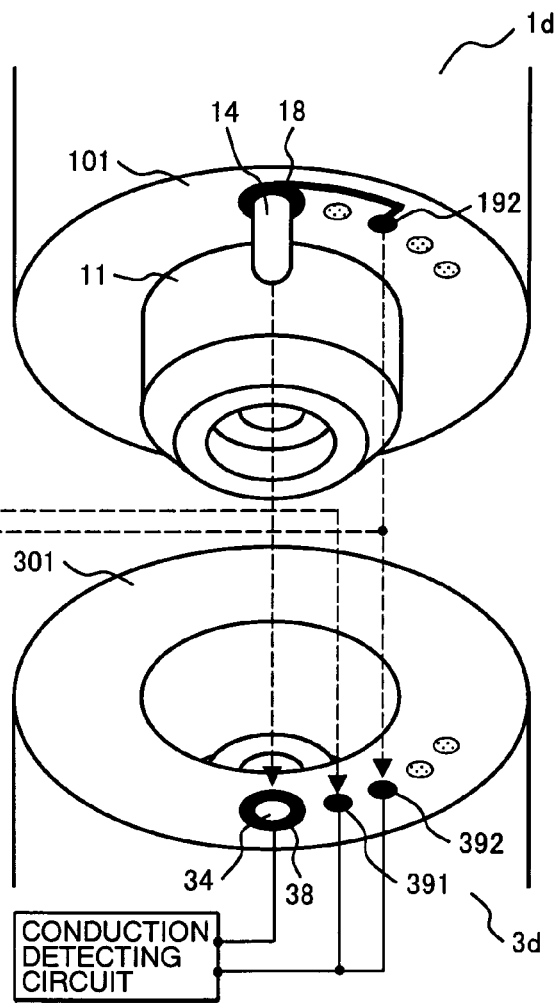

FIG. 11

○ : CONNECTABLE    × : NOT CONNECTABLE

| No. | POSITIONS AND NUMBER OF DISTINGUISHING HOLES ● AT COUPLER 3 | POSITIONS OF DISTINGUISHING PIN ● OF FUEL CARTRIDGE 1 | | | |
|---|---|---|---|---|---|
| | | 151p<br>●○○○ | 152p<br>○●○○ | 153p<br>○○●○ | 154p<br>○○○● |
| 1 | ●○○○ | ○ | × | × | × |
| 2 | ○●○○ | × | ○ | × | × |
| 3 | ○○●○ | × | × | ○ | × |
| 4 | ○○○● | × | × | × | ○ |
| 5 | ●●○○ | ○ | ○ | × | × |
| 6 | ○●●○ | × | ○ | ○ | × |
| 7 | ○○●● | × | × | ○ | ○ |
| 8 | ●●●○ | ○ | ○ | ○ | × |
| 9 | ○●●● | × | ○ | ○ | ○ |
| 10 | ●●●● | ○ | ○ | ○ | ○ |

FIG. 12

○ : CONNECTABLE    × : NOT CONNECTABLE

| POSITIONS AND NUMBER OF DISTINGUISHING HOLES ● AT COUPLER 3 | POSITIONS OF DISTINGUISHING PIN ● OF FUEL CARTRIDGE 1 | | | |
|---|---|---|---|---|
| | 151p ●○○○ | 152p ○●○○ | 153p ○○●○ | 154p ○○○● |
| ●○○○ | ○ | × | × | × |
| ○●○○ | × | ○ | × | × |
| ○○●○ | × | × | ○ | × |
| ○○○● | × | × | × | ○ |
| ●●○○ | ○ | ○ | × | × |
| ●○●○ | ○ | × | ○ | × |
| ●○○● | ○ | × | × | ○ |
| ○●●○ | × | ○ | ○ | × |
| ○●○● | × | ○ | × | ○ |
| ○○●● | × | × | ○ | ○ |
| ●●●○ | ○ | ○ | ○ | × |
| ●●○● | ○ | ○ | × | ○ |
| ●○●● | ○ | × | ○ | ○ |
| ○●●● | × | ○ | ○ | ○ |
| ●●●● | ○ | ○ | ○ | ○ |

FUEL CARTRIDGE FOR FUEL CELLS, FUEL CELL, FUEL CELL POWER SYSTEM AND METHOD OF MOUNTING A FUEL CELL CARTRIDGE ON A FUEL CELL

CLAIM OF PRIORITY

This application claims priority from Japanese application Serial No. 2004-295809, filed on Oct. 8, 2004, the content of which is hereby incorporated by reference into this application.

FIELD OF THE INVENTION

The present invention relates to a fuel cartridge that is mounted on a fuel cell such as a direct methanol fuel cell (DMFC) or the like for supplying liquid fuel such as methanol/water solution to the fuel cell. Further, the invention relates to a power system composed of a fuel cartridge and a fuel cell and a method of mounting a fuel cartridge on a fuel cell.

BACKGROUND OF THE INVENTION

With a progress in electronic technology in recent years, a telephone, notebook type personal computer, audio/visual equipment or mobile terminal equipment is downsized; as a result, these devices have been rapidly widespread as a mobile electronic device. A fuel cell power source has been considered as a power source for a mobile electronic device. Since a fuel cell electrochemically and directly converts chemical energy possessed by a fuel into electric energy, it does not require a power section such as a generator using an internal combustion engine, which is an ordinary engine generator. Therefore, it has high practicability as a compact power-generating device. Further, the fuel cell continues a motive power generation so long as a fuel is replenished thereto; it is unnecessary to temporarily stop an operation of a device such as a load for charge, like the case where a normal secondary battery is used.

Widely known fuel cells are those wherein hydrogen generated by reforming city gas or the like is used as a fuel. An operation temperature of this type of fuel cells is not lower than 80° C. Fuel cells operating at a room temperature include the one wherein a liquid fuel is directly oxidized at a fuel electrode of the fuel cell; the typical one is a direct methanol fuel cell (DMFC) wherein methanol is directly oxidized.

A method for supplying a fuel to a fuel cell includes the one wherein a fuel for a power generation is sealed in a fuel cartridge and this fuel cartridge is mounted on the fuel cell, thereby supplying the fuel for a power generation to the fuel cell from the fuel cartridge via a fuel supply interface (e.g., see Patent Reference 1).

[Patent Reference 1]
Japanese Patent Laid-Open No. 2003-45468 (Summary)

A mixed solution of methanol and pure water has been studied as a fuel for a direct methanol fuel cell. An appropriate range is present in the methanol concentration in the mixed solution depending upon characteristics of a fuel cell. If a fuel having a concentration which is greatly outside the appropriate range is supplied to the fuel cell, the fuel cell does not exhibits a satisfactory output performance of the fuel cell, and further, adverse effects may possibly be given to components composing the fuel cell. Therefore, there arises a subject that it is necessary to detect whether a fuel contained in a fuel cartridge is appropriate for the fuel cell or not.

SUMMARY OF THE INVENTION

An object of the present invention is to distinguish whether the fuel contained in the fuel cartridge is appropriate for the fuel cell or not, and to supply the fuel in the fuel cartridge when it is appropriate. The present invention aims at providing the fuel cartridge and the fuel cell, and a method of mounting the fuel cell cartridge on the fuel cell. A fuel cartridge for a fuel cell of the present invention has at its outer face a specific member for distinguishing a methanol concentration of a methanol solution fuel contained therein. Further, a fuel cell according to the present invention is provided with a concentration recognizing member for determining whether the member for distinguishing the fuel concentration provided at the fuel cartridge is located at a position where a fuel supply is accepted.

Further, in the present invention, a positioning member for positioning the fuel cartridge when the fuel cartridge is mounted on the fuel cell is provided at the outer face of the fuel cartridge, and a position fixing member is provided at the fuel cell such that the fuel cartridge is mounted when the positioning member is located at an appropriate position.

According to a fuel cartridge for a fuel cell of the present invention, a fuel cell distinguishes a methanol concentration of a contained methanol solution fuel for determining whether supplying this fuel is appropriate or not, whereby the connection of the fuel cell is made mechanically possible or impossible, or a signal indicating that it is appropriate or not can be taken out. Therefore, only a fuel having an appropriate concentration can be supplied to a fuel cell.

BRIEF DESCRIPTION OF THE DRAWINGS

FIGS. 5a and 5b are views showing a connecting section between a fuel cartridge for a fuel cell and a fuel cell according to a second embodiment of the invention.

FIGS. 8a and 8b are views showing a connecting section between a fuel cartridge for a fuel cell and a fuel cell according to a sixth embodiment of the invention.

FIGS. 11 and 12 are tables showing the conditions of connection of the fuel cartridge of the present invention with the fuel cell.

DESCRIPTION OF THE PREFERRED EMBODIMENTS

Embodiments of the present invention will be explained hereinafter, but the invention is not limited thereto.

Firstly, a fuel cartridge for a fuel cell and a fuel cell to which a fuel cartridge is inserted will be explained with reference to FIGS. 1 to 3b. Here, a positioning member and concentration distinguishing member are not provided at the fuel cartridge, and further, a position fixing member and concentration recognizing member are not provided at the fuel cell.

Figure 1:
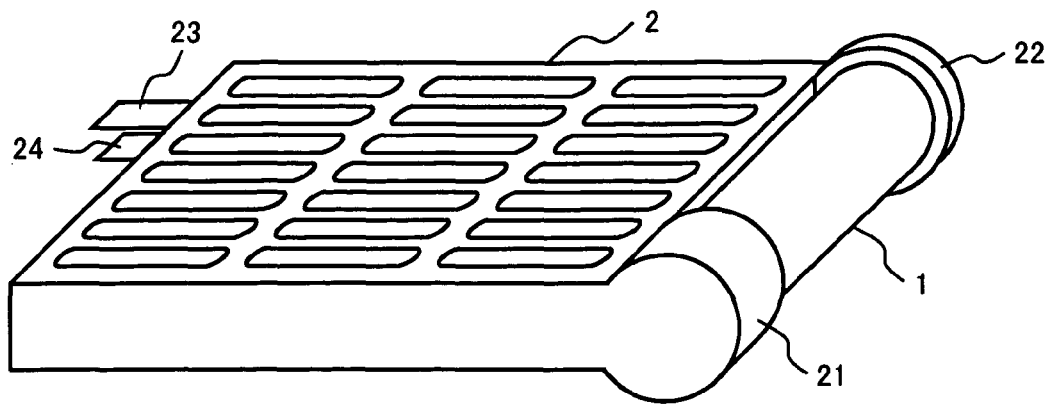
FIG. 1 is a perspective view showing a fuel cell on which a fuel cartridge is mounted.

FIG. 1 shows a state wherein a fuel cartridge 1 for a fuel cell is attached to a fuel cell 2 that is mounted on a notebook type personal computer or other devices. The fuel cell 1 is inserted into a fuel cartridge receiver 21 of the fuel cell 2. It is fixed by a fuel cartridge holder 22 attached to the fuel cell 2 so as not to fall out after the insertion. The fuel cell 2 has DC terminals 23 and 24 that are electrically connected to the device for supplying electric power.

Figure 2:
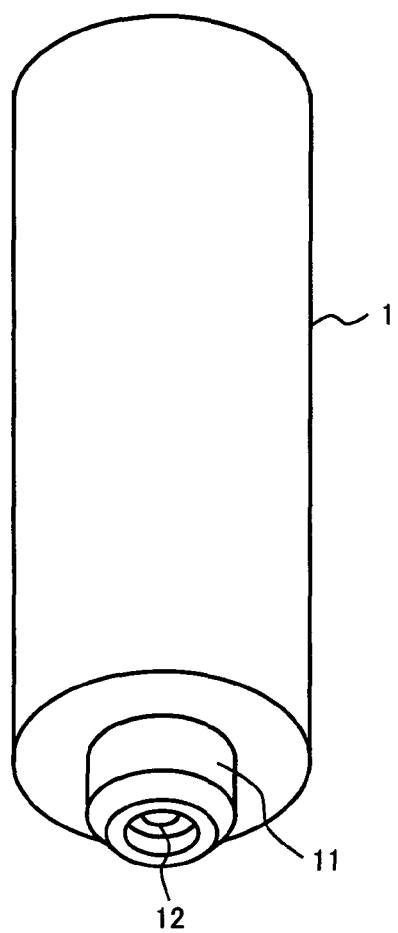
FIG. 2 is a perspective view showing a general example of a fuel cartridge for a fuel cell.

The fuel cartridge 1 is a closed container for containing a liquid fuel to be supplied to the fuel cell as shown in FIG. 2. The fuel cartridge 1 is provided with a connector 11 that is connected to the fuel cell 2 so as to serve as a fuel supply port when inserted into the fuel cartridge receiver 21 of the fuel cell 2. A valve 12 is provided in the connector 11.

The state wherein the fuel cartridge 1 is connected to the fuel cell 2 will be explained with reference to a sectional view of FIGS. 3a and 3b.

Figure 3A:
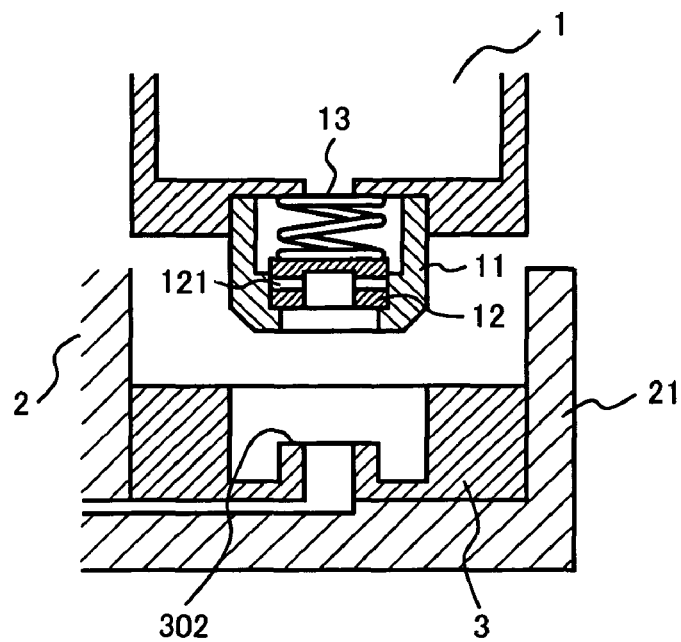
FIGS. 3a and 3b are views showing a connection between the fuel cartridge for a fuel cell and the fuel cell.

As shown in FIG. 3a, the valve 12 in the connector 11 is an open/close device for opening or shutting the flow channel of the liquid fuel. It is pushed toward the outlet side of the connector 11 by a compression coil spring 13. With this state, a serial hole 121 communicating with the side face from a central cavity of the valve 12 is closed, so that the liquid fuel contained in the fuel cartridge 1 is not leaked to the outside of the cartridge. On the other hand, a coupler 3 is provided in the fuel cartridge receiver 21 of the fuel cell 2, wherein a projecting section 302 provided with a through hole is formed at the center of the coupler 3. This through hole serves as a receiving port for supplying the liquid fuel to the fuel cell 2 via a channel in the fuel cartridge receiver 21.

Figure 3B:
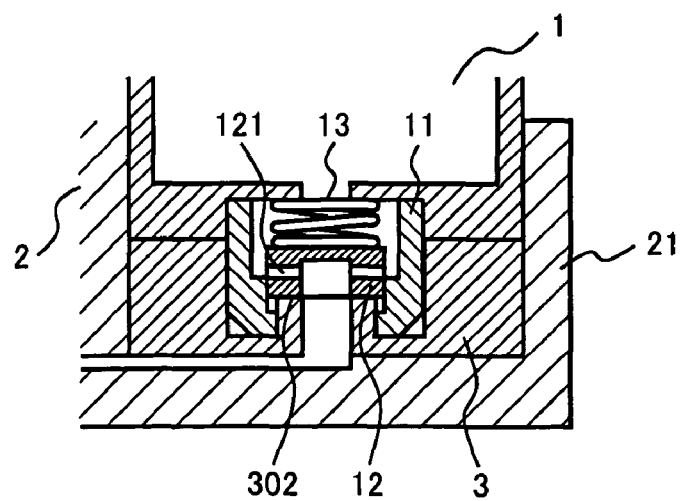

When the fuel cartridge 1 is inserted to the end of the fuel cartridge receiver 21, and the state shown in FIG. 3b is established, the connector 11 of the fuel cartridge 1 is inserted into the coupler 3 of the fuel cell 2, whereby the valve 12 is pushed inward of the fuel cartridge 1 by the projecting section 302. When this state is established, the serial hole 121 is opened to the cavity of the connector 11, whereby the liquid fuel in the fuel cartridge 1 is supplied to the fuel cell 2 via the cavity of the connector 11, serial hole 121, central cavity of the valve 12, through hole at the coupler 3 of the fuel cell 2, and channel in the fuel cartridge receiver 21.

When the fuel cartridge 1 is pulled out from the fuel cartridge receiver 21 of the fuel cell 2, the connector 11 is returned to the original position by an action of the compression coil spring 13, so that the state shown in FIG. 3a is established wherein the serial hole 121 is closed.

It should be noted that, in the above-mentioned configuration, a gasket (not shown) is provided at a required section in order to prevent the fuel from leaking from the fuel cartridge 1 or from a gap when the fuel cartridge 1 and the fuel cell 2 are connected to each other.

A mechanism that applies pressure from the inside to the contained liquid fuel to inject the fuel into the fuel cell 2 from the connector 11 may be provided at the fuel cartridge.

In the case of the configurations shown in FIGS. 1 to 3B, the liquid fuel used in the fuel cell 2 is a mixed solution of methanol and pure water. Even if the highest cell output can be obtained when the methanol concentration is 30%, as an example, a fuel cartridge that contains a liquid fuel having a concentration other than the aforesaid concentration may be mounted on the fuel cell.

Embodiment 1

Figure 4A:
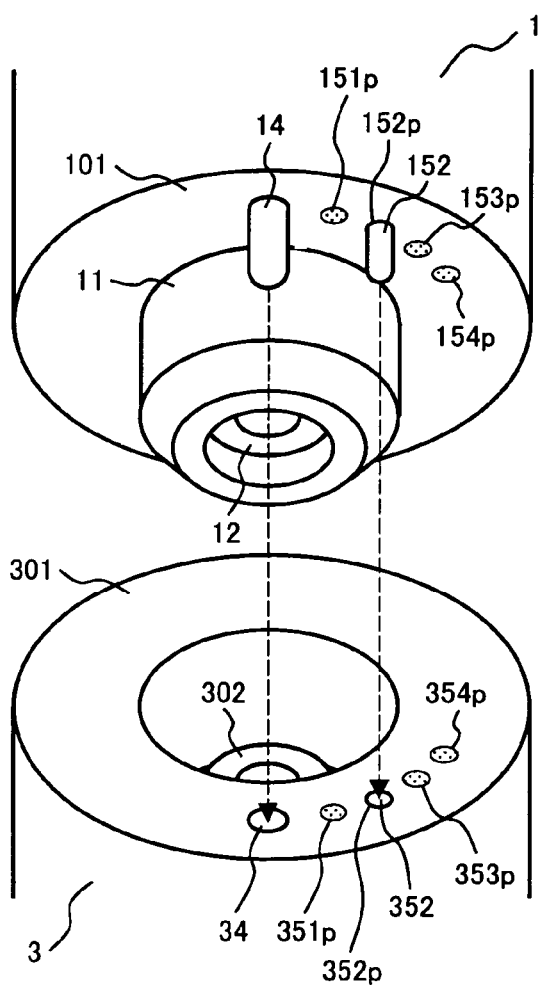
FIGS. 4a and 4b are views showing a connecting section between a fuel cartridge for a fuel cell and a fuel cell according to a first embodiment of the invention.

A fuel cartridge for a fuel cell and a fuel cell according to a first embodiment of the present invention will be explained with reference to FIGS. 4a and 4b. The same numerals are given to the components same as those explained in FIGS. 1 to 3b, and the detailed explanation thereof is omitted.

Figure 4B:
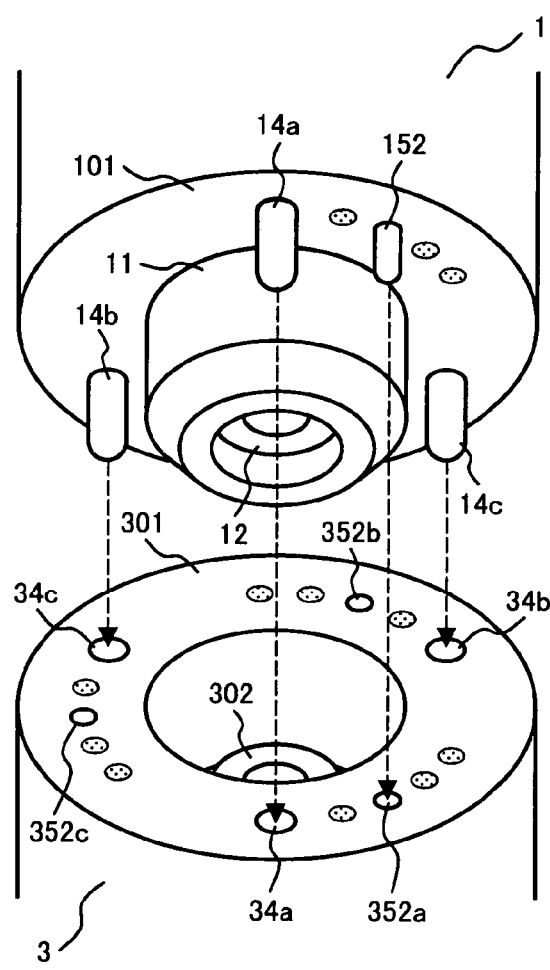

In FIG. 4b, a positioning pin 14 and a distinguishing pin 152 are provided at the position surrounding the connector 11 at an end face 101 to which the connector 11 of the fuel cartridge 1 is attached. The positioning pin corresponds to a positioning member described in the present invention, while the distinguishing pin corresponds to a concentration distinguishing member described in the invention. The distinguishing pin 152 is set at the second distinguishing pin position 152p of the distinguishing pin positions 151p, 152p, 153p and 154p decided with a predetermined arrangement with the positioning pin 14 defined as a reference. The distinguishing pin 152 has a diameter and length smaller than those of the positioning pin 14. In this embodiment, the diameter and length of the distinguishing pin 152 are two-thirds of those of the positioning pin 14. On the other hand, a positioning hole 34 and distinguishing hole 352 are formed at a face 301 of the coupler 3 of the fuel cell 2 facing the fuel cartridge 1. The positioning hole corresponding to a position fixing member described in the present invention, while the distinguishing hole corresponds to a concentration recognizing member described in the invention. The distinguishing hole 352 is set at the second distinguishing hole position 352p of the distinguishing hole positions 351p, 352p, 353p and 354p decided with a predetermined arrangement with the positioning hole 34 defined as a reference. Further, each of the poisoning hole 34 and distinguishing hole 352 has a size such that the positioning pin 14 and the distinguishing pin 152 of the fuel cartridge 1 are substantially fitted without a gap.

In the present embodiment, the sizes and arrangements of the positioning pin 14 and the distinguishing pin 152 at the fuel cartridge 1 are relatively agreed with the sizes and arrangements of the positioning hole 34 and the distinguishing hole 352 at the coupler 3, whereby the fuel cartridge 1 can be inserted into the coupler 3 to supply the liquid fuel to the fuel cell 2. The fuel cartridge 1 cannot be inserted to the end of the coupler 3 having no positioning hole 34 and distinguishing hole 352, and the coupler 3 having the positioning hole and distinguishing hole but the distinguishing hole 352 is not set at the distinguishing hole position 352p. Thereby, the fuel cartridge 1 is prevented from being connected to a fuel cell with inappropriate concentration. Further, the length of each of the positioning pin 14 and the distinguishing pin 152 takes a proper value, so that the projecting section 302 at the coupler 3 does not push the valve 12 of the fuel cartridge 1 with the state where the fuel cartridge 1 cannot be inserted into the coupler 3. Accordingly, the fuel contained in the fuel cartridge 1 is not leaked from the connector 11.

In FIG. 4b, three positioning pins 14a, 14b and 14c are set to the fuel cartridge 1 at the arrangement of rotational symmetry of every 120 degrees. The distinguishing pin 152 is set at a predetermined position with respect to the positioning pin 14a. On the other hand, three sets of positioning hole 34a and distinguishing hole 352a, positioning hole 34b and distinguishing hole 352b and positioning hole 34c and distinguishing hole 352c are formed on the coupler 3 at the arrangement of rotational symmetry of every 120 degrees. The fuel cartridge 1 can be inserted into the coupler 3 at three positions, each having a rotational angle of 120 degrees, not at only one place. Therefore, it is easier than the case of FIG. 4b to find the inserting position as the fuel cartridge 1 is rotated, when the fuel cartridge 1 is inserted into the fuel cell 2. Further, the fuel cartridge 1 having only one distinguishing pin shown in FIG. 4b can be inserted to the coupler 3 in FIG. 4b at three positions.

Embodiment 2

In the second embodiment, as shown in FIGS. 5a and 5b, the positioning pin 14 is provided and the distinguishing pin 151 is set to the distinguishing position 151p at the fuel cartridge 1a, while at the fuel cartridge 1b, the positioning pin 14 and the distinguishing pin 152 are set like the case of FIG. 4b. On the other hand, the positioning hole 34 is formed and the distinguishing hole 351 is formed at the distinguishing position 351p at the coupler 3a, while the positioning hole 34 is formed and the distinguishing holes 351 and 352 are set at the distinguishing positions 351p and 352p at the coupler 3b.

A fuel having a methanol concentration of 30% is contained in the fuel cartridge 1a, while a fuel having a methanol concentration of 60% is contained in the fuel cartridge 1b. The coupler 3a is mounted on a fuel cell 2a (not shown) whose appropriate fuel concentration is 30%, and the coupler 3b is mounted on a fuel cell 2b (not shown) whose appropriate fuel concentration is not more than 60% (30% is also possible). The fuel cartridge 1a can be connected to the coupler 3a and the coupler 3b, which means that the fuel cartridge 1a can supply a fuel having an appropriate concentration to the fuel cell 2a and the fuel cell 2b. The fuel cartridge 1b can be connected to the coupler 3b, but cannot be connected to the coupler 3a. This means that the fuel cartridge 1b can supply a fuel having an appropriate concentration to the fuel cell 2b, and it can prevent that a fuel having inappropriate concentration can be supplied to the fuel cell 2a.

Four types of fuel cartridges 1 were prepared here having the positions 151p, 152p, 153p and 154p for the distinguishing pin as shown in FIG. 4b. Each of the fuel cartridges contained a fuel with a methanol concentration of 30%, a fuel with 60%, a fuel with 80% and a fuel with 100%, respectively. FIG. 11 shows that which one of the four types of fuel cartridges 1 can be connected and which one of the four types of fuel cartridges 1 cannot be connected, depending upon the position and number of the distinguishing hole formed at the coupler 3. In FIG. 11, only one type of the fuel cartridge 1 having the fuel with appropriate concentration can be connected to each coupler 3 of No. 1 to No. 4. Two types of fuel cartridges 1 each having a fuel with a concentration of 30% and a fuel with 60%, a fuel with 60% and 80%, and a fuel with 80% and 100% can be connected to each coupler 3 of No. 5 to No. 7. Three types of fuel cartridges 1 each having a fuel with a concentration of 30%, a fuel with 60%, and a fuel with 80% can be connected to the coupler 3 of No. 8. Three types of fuel cartridges 1 each having a fuel with a concentration of 30%, a fuel with 60% and a fuel with 80% can be connected to the coupler 3 of No. 9. All of four types of fuel cartridges 1 each having a fuel with a concentration of 30%, a fuel with 60%, a fuel with 80% and a fuel with 100% can be connected to the coupler of No. 10. A certain range is allowed in the fuel concentration appropriate for a fuel cell, and the allowable range is different from each fuel cell. The position of the distinguishing pin, the position of the distinguishing hole and its number are combined with each other as described above, whereby a fuel concentration for a fuel cell can be distinguished and only a fuel cartridge containing a fuel having an appropriate concentration can selectively be connected according to its allowable range, and further, a fuel cartridge containing a fuel having inappropriate concentration cannot be connected.

The same result was obtained in the case where the fuel cartridge 1 can be connected to a coupler 3 at plural positions of rotational symmetry as shown in FIG. 4b.

In order to distinguish an appropriate fuel concentration for a fuel cell at a smaller interval, the number of the distinguishing pin and the number of the distinguishing position to which the distinguishing hole is set is increased, such as five, six, or the like.

Embodiment 3

Four types of fuel cartridges 1 were prepared having the positions 151p, 152p, 153p and 154p for the distinguishing pin as shown in FIG. 4b, like the second embodiment. Each of the fuel cartridges contained a fuel having a methanol concentration of 30% and not pressurized in the fuel cartridge 1, a fuel having a methanol concentration of 60% and not pressurized in the fuel cartridge 1, a fuel having a methanol concentration of 30% and pressurized in the fuel cartridge 1 and a fuel having a methanol concentration of 60% and pressurized in the fuel cartridge 1, respectively. FIG. 12 shows that which one of the four types of fuel cartridges 1 can be connected and which one of the four types of fuel cartridges 1 cannot be connected, depending upon the position and number of the distinguishing hole formed at the coupler 3. Table 2 shows all combinations, from the case where only one type of fuel cartridges 1 can be connected, to the case where all of four types of fuel cartridges can be connected. The position of the distinguishing pin, the position of the distinguishing hole and its number are combined with each other as described above, whereby a fuel concentration for a fuel cell can be distinguishing and only a fuel cartridge containing a fuel having an appropriate concentration can selectively be connected according to its allowable range, and further, a fuel cartridge containing a fuel having inappropriate concentration cannot be connected.

The position of the distinguishing pin, the position of the distinguishing hole and its number are combined, including not only fuel concentration or pressure but also other distinguishing conditions such as the name of a manufacturer, by the same mechanism, whereby single or plural conditions can be selected.

Providing the positioning pin and distinguishing pin at the coupler 3 and forming the positioning hole and distinguishing hole at the fuel cartridge 1 makes it possible to select a fuel cartridge containing a fuel appropriate for a fuel cell by the similar mechanism.

Embodiment 4

A fourth embodiment of the present invention will be explained with reference to FIGS. 6a and 6b. In the fuel cartridge 1 in FIG. 6a, a positioning projection 16 and a distinguishing projection 173 are formed at the side face of the connector 11, instead of the positioning pin and the distinguishing pin. Further, instead of the positioning hole and distinguishing hole, a positioning groove 36 into which the positioning projection 16 is inserted and a distinguishing groove 373 into which the projection 173 is inserted are provided. The distinguishing projection 173 has a size two-thirds of that of the positioning projection 16. In the fuel cartridge 1 shown in FIG. 6b, three positioning projections 16 are provided at the arrangement of rotational symmetry.

Moreover, three sets of positioning groove 36 and distinguishing groove 371, positioning groove 36 and distinguishing groove 372 and positioning groove 36 and distinguishing groove 373 are provided at the coupler 3 at the arrangement of rotational symmetry.

Figure 6A:
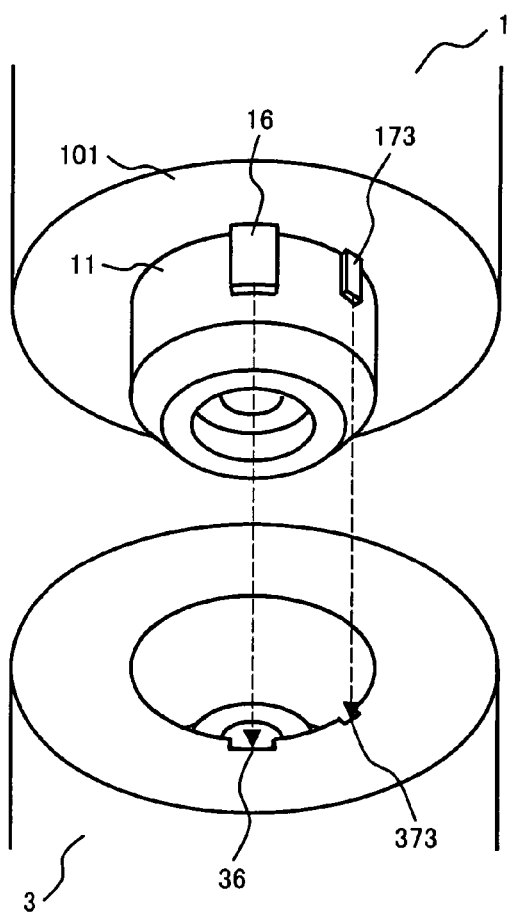
FIGS. 6a and 6b are views showing a connecting section between a fuel cartridge for a fuel cell and a fuel cell according to a fourth embodiment of the invention.
Figure 6B:
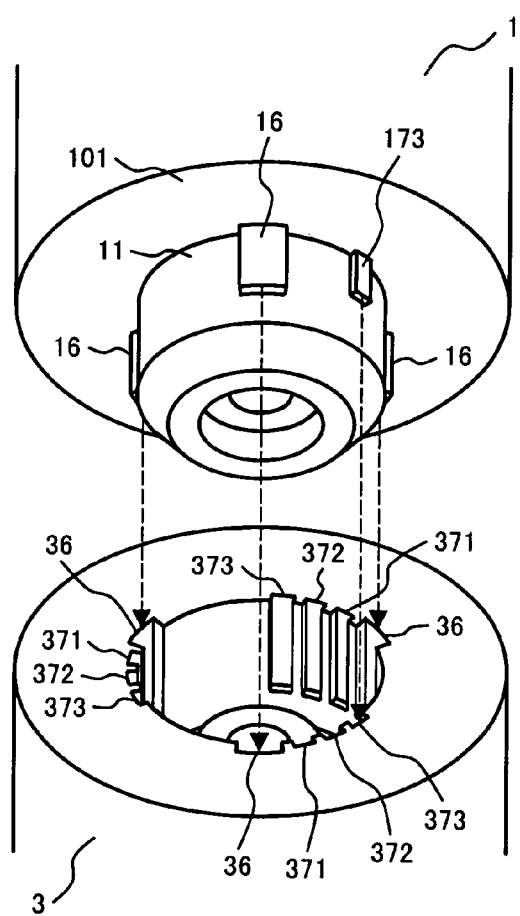

Like the aforesaid embodiments, only a fuel cartridge of a specific type can be connected in the case of FIG. 6a, and three types of fuel cartridges including a fuel cartridge not shown can selectively be connected at three positions, each rotating at 120 degrees, in the case of FIG. 6b, by this distinguishing structure.

Embodiment 5

Figure 7:
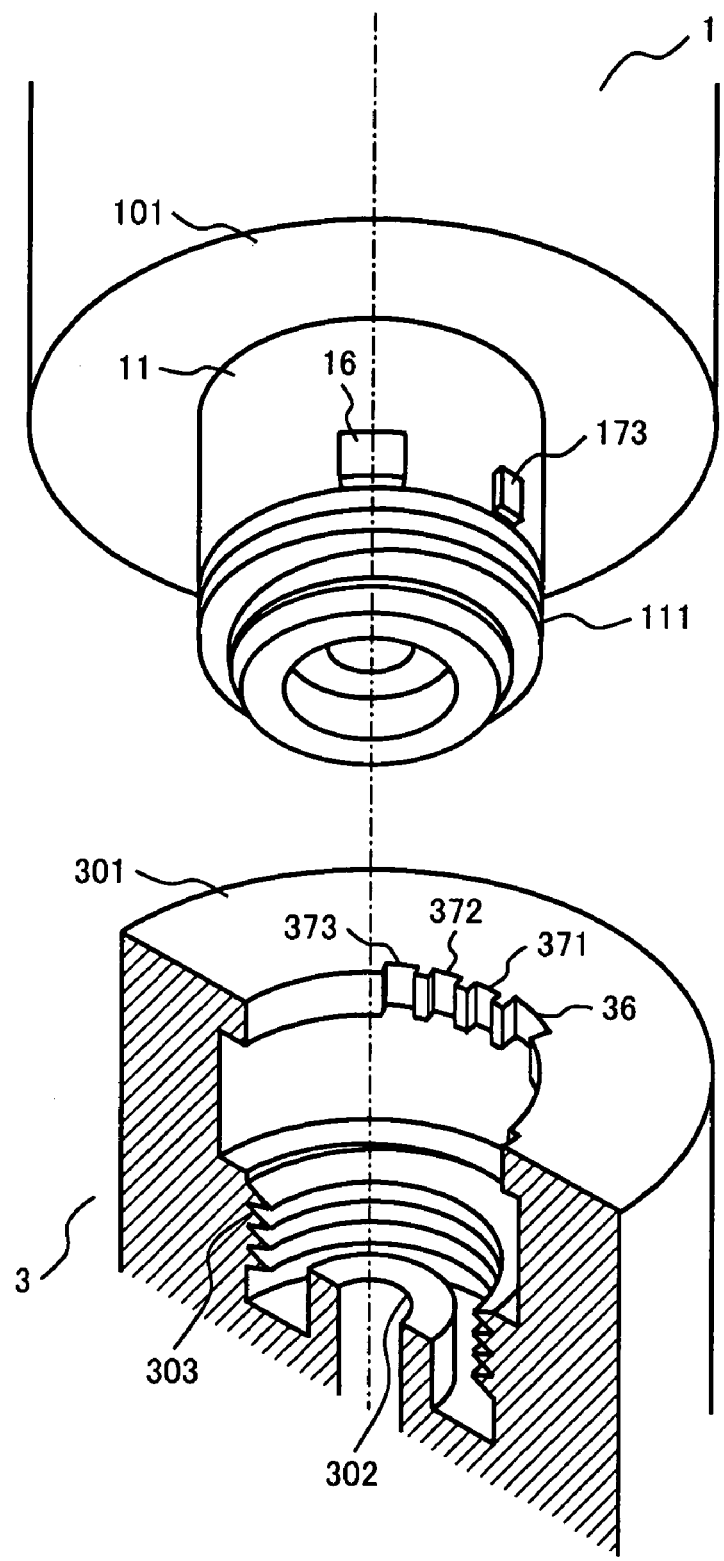
FIG. 7 is a view section between a fuel cartridge for a fuel cell and a fuel cell according to a fifth embodiment of the invention.

A fifth embodiment of the present invention will be explained with reference to FIG. 7 in which 111 for fixing the fuel cartridge 1 to the coupler 3 is provided at the leading end of the connector 11 at the fuel cartridge 1. Further, the positioning projection 16 and the distinguishing projection 173 provided at the side face of the connector 11 do not come in contact with the end face 101, so that there are no projecting members present between the projection at the side face of the connector 11 and the end face 101. Moreover, a screw section 303 is provided at the coupler 3 such that the screwed connector 11 can be inserted to the deepest thereof. The positioning groove 36 and the distinguishing grooves 371, 372 and 373 are provided at the inner periphery of the face 301 facing the fuel cartridge 1, and the section up to the screw section 303 positioned deep into these grooves forms a space where the positioning projection 16 and the distinguishing projection 173 can be rotated inside of the fuel cartridge 1. By this configuration, in the procedure for inserting the fuel cartridge 1 into the coupler 3, the positioning projection 16 and the distinguishing projection 173 pass through the positioning groove 36 and the distinguishing groove 373 at the coupler 3 as sorted by the same grooves, and then, the fuel cartridge 1 is brought into a rotatable state, whereupon the fuel cartridge 1 is inserted to the end of the coupler 3 by the meshing between the screw section 111 and the screw section 303, thereby being fixed. The mechanism for selecting a proper fuel cartridge for a fuel cell by the combination of the position of the positioning projection and distinguishing projection at the fuel cartridge and the position and number of the positioning groove and distinguishing groove at the coupler is the same as that of the aforesaid embodiments.

Embodiment 6

In a sixth embodiment, a distinguishing contact is provided instead of the distinguishing pin and distinguishing hole as shown in FIGS. 8a and 8b. A positioning contact 18 is provided, along with the positioning pin 14 at the end face 101 of the fuel cartridge 1c. A distinguishing contact 191 that is electrically connected to the positioning contact 18 is provided at a predetermined position. On the other hand, a positioning contact 38 is provided with the positioning hole 34 at the face 301 of the coupler 3c, and a distinguishing contact 391 is provided at a predetermined position. The positioning contact 38 and the distinguishing contact 391 are electrically connected to a conduction detecting circuit at the inner section via the coupler 3. When the fuel cartridge 1 is inserted into the coupler 3 and the positioning contact 18 and the positioning contact 38 are brought into contact with the distinguishing contact 191 and distinguishing contact 391 respectively, the conduction detecting circuit detects the conduction, thereby transmitting a conduction signal to a circuit (not shown) in the fuel cell. The operation such as opening the valve at the fuel channel in the fuel cell, giving a confirmation sound, supplying cell output to the device, or the like can be carried out by using this conduction signal. A distinguishing contact 192 is provided at a fuel cartridge 1d, while distinguishing contacts 391 and 392 are provided at a coupler 3d. The positioning contact 38 and the distinguishing contacts 391 and 392 are electrically connected to the conduction detecting circuit at the inner section via the coupler 3. The fuel cartridge 1c generates the conduction signal in the case where it is connected to the coupler 3c and the coupler 3d. The fuel cartridge 1d does not generate the conduction signal when connected to the coupler 3c, but generates a conduction signal when connected to the coupler 3d. As described above, the type of the fuel cartridge is distinguished by the conduction signal, whereby whether the fuel in the fuel cartridge can be supplied to the fuel cell or not is electrically controlled and the accompanied electronic operation can be performed.

Embodiment 7

Figure 9A:
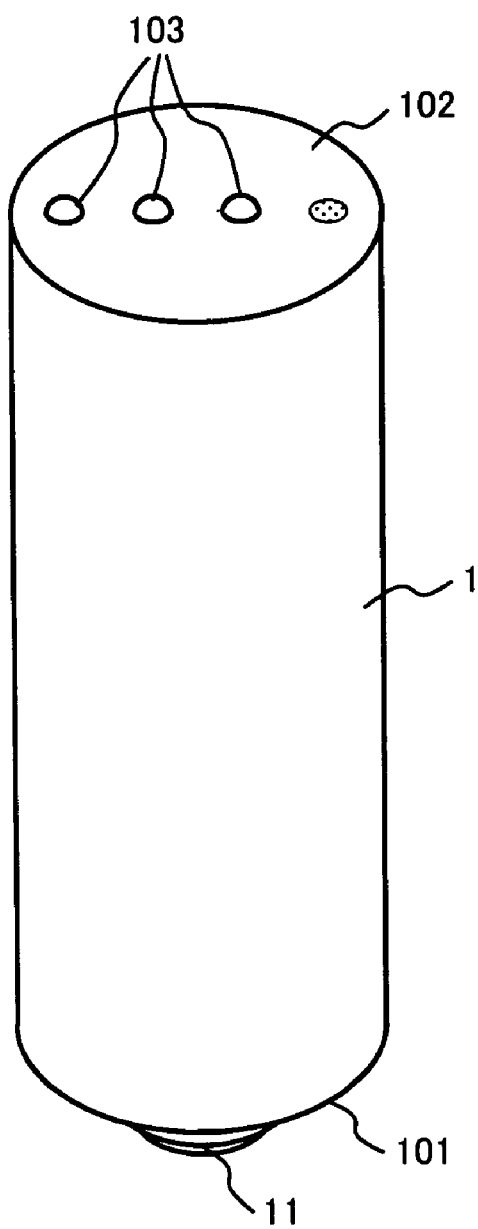
FIGS. 9a and 9b are views showing a connecting section between a fuel cartridge for a fuel cell and a fuel cell according to a seventh embodiment of the invention.
Figure 9B:
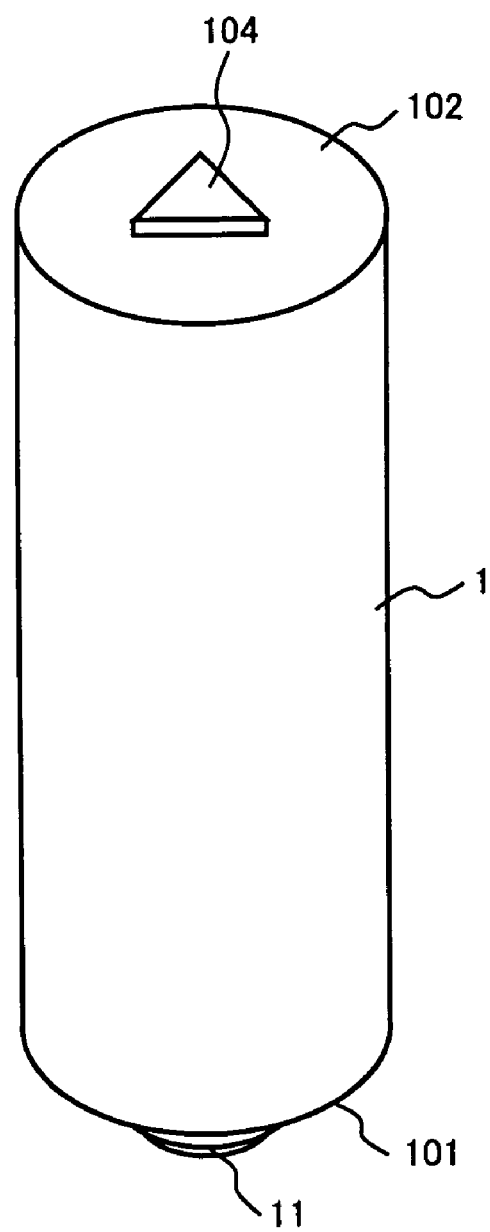

In a seventh embodiment of the present invention, a mechanism for distinguishing a type of a fuel cartridge with a feeling of touch is provided, in addition to a distinguishing structure at a connector section of a fuel cartridge. In FIG. 9a, three small projections 103 that can be recognized by a finger touch are provided at the end face 101 to which the connector 11 of the fuel cartridge 1 is attached and at the opposite end face 102. According to this, the fuel cartridge 1 can be recognized, by a feeling of touch, as the third one of four types of fuel cartridges, for example. Further, a triangle projection 104 is provided in FIG. 9b. In this case too, this fuel cartridge can be recognized as a specific type by a feeling of touch. The type of the fuel cartridge can be recognized by touching the distinguishing pin or distinguishing projection provided in the vicinity of the connector 11. However, it is difficult to recognize the type of the fuel cartridge by the positional difference of the distinguishing pin or distinguishing projection. Providing a mechanism separately as in this embodiment facilitates the recognition. The end face 102 is a place easy to touch when the fuel cartridge 1 is inserted into the fuel cartridge receiver 2 of the fuel cell 2 in FIG. 1, so that this mechanism is useful for recognizing its type even in case where the fuel cartridge cannot visually be confirmed depending upon a surrounding brightness or condition.

Embodiment 8

Figure 10A:
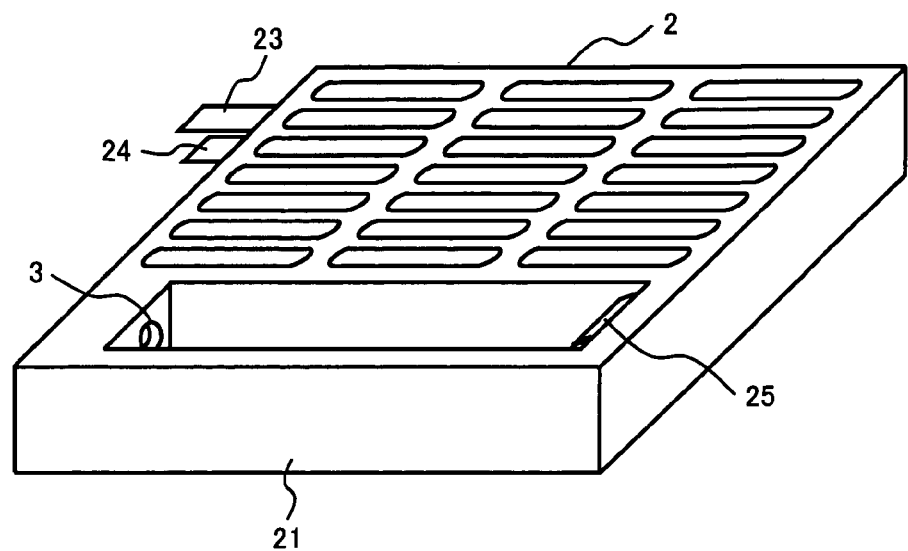
FIGS. 10a to 10c are views showing a fuel cell, a fuel cartridge for a fuel cell and a state for connecting the fuel cartridge to the fuel cell according to an eighth embodiment of the invention.
Figure 10B:
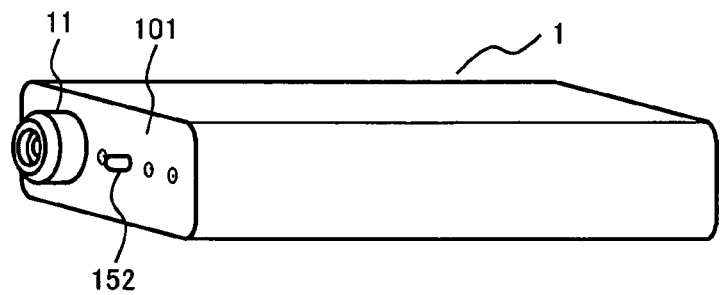
Figure 10C:
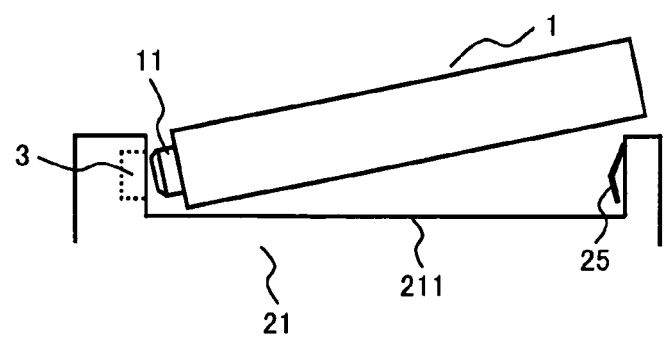

The present invention is applicable to a fuel cartridge having a shape different from those described in the aforesaid embodiments. A fuel cell 2 shown in FIG. 10a is provided with a fuel cartridge receiver 21 having a rectangular space for accommodating the fuel cartridge 1 shown in FIG. 10b in a plane manner. The fuel cartridge 1 is mounted as follows as shown in FIG. 10c. A connector 11 is held against a coupler 3 at the fuel cartridge receiver 21, and then, the bottom section of the fuel cartridge 1 is pushed downward and fixed by a plate spring 25. In this case, a distinguishing pin 152 is provided at a predetermined position of the face 101 of the fuel cartridge 1 facing to the coupler 3, and a distinguishing hole (not shown) is formed at the predetermined position of the connector. This makes it possible to determine whether the fuel cartridge 1 contains a fuel appropriate for the fuel cell 2 or not, thereby allowing or not allowing the connection of the fuel cartridge 1. The mechanism for sorting by the combination of the distinguishing pin and the distinguishing hole is the same as those disclosed in the foregoing embodiments.

It should be noted that the position of the distinguishing pin and the position of the distinguishing hole are not limited to those in this embodiment. A bottom face 211 of the fuel cartridge receiver 21 in FIG. 10C may be used. Further, a distinguishing projection may be provided at the side face of the fuel cartridge 1, and a distinguishing groove may be formed at the side face of the space for accommodating the fuel cartridge 1.

The present invention can realize a fuel cell to which only a fuel cartridge containing a fuel having appropriate methanol concentration can be mounted. The industrial applicability of this fuel cell is extremely high.

What is claimed is:

1. A fuel cell power system comprising:
   a fuel cartridge; and
   a fuel cell;
   wherein the fuel cartridge comprises:
      a container for containing methanol solution fuel of a predetermined concentration;
      a connector having a predetermined shape provided at an outer face of the container for coupling the fuel cartridge to the fuel cell;
      a positioning member provided at an outer face of the container on or near the connector for determining a rotational position of the fuel cartridge with respect to the fuel cell at a time of mounting the fuel cartridge on the fuel cell; and
      a concentration distinguishing member for distinguishing a methanol concentration of the methanol solution fuel, the concentration distinguishing member being provided at the outer face of the container on or near the connector; and
   wherein the fuel cell comprises:
      a coupler having a shape configured to receive the connector of the fuel cartridge;
      a position determining member for recognizing a position of the positioning member and determining the rotational position of the fuel cartridge; and
      a concentration judging member for determining whether a fuel is acceptable if the concentration distinguishing member provided on a container of a first fuel cartridge is aligned with the concentration judging member or is not acceptable if the concentration distinguishing member provided on a container of a second fuel cartridge having a connector of the same shape as the first fuel cartridge but having a different methanol solution fuel concentration is not aligned with the concentration judging member.

2. The fuel cell power system claimed in claim 1, wherein the concentration distinguishing member provided on the container is a pin, and the concentration judging member provided at the fuel cell is a hole, wherein a determination is made as to whether the fuel contained in the fuel cartridge is appropriate or not by whether or not the pin is inserted into the hole.

3. The fuel cell power system claimed in claim 1, wherein the concentration distinguishing member provided on the container is a projection, and the concentration judging member provided at the fuel cell is a groove, wherein a determination is made as to whether the fuel contained in the fuel cartridge is appropriate or not by whether or not the projection is fitted into the groove.

4. The fuel cell power system claimed in claim 1, wherein the concentration distinguishing member provided on the container is an electrical contact, wherein a determination is made as to whether the fuel contained in the fuel cartridge is appropriate or not by whether or not the electrical contact is connected to an electrical circuit, serving as the concentration judging member, provided at the fuel cell when the fuel cartridge is mounted on the fuel cell.

5. A fuel cell power system comprising a fuel cell claimed in claim 1, wherein the positioning member and the concentration distinguishing member provided on the container and the position determining member and the concentration judging member provided at the fuel cell are provided to have a predetermined positional relationship.

6. A method of mounting a fuel cartridge on a fuel cell, comprising:
   providing a first fuel cartridge comprising a container for containing a methanol solution fuel of a predetermined concentration, a connector having a predetermined shape provided at an outer face of the container for coupling the fuel cartridge to the fuel cell, a positioning member provided at the outer face of the container on or near the connector for determining a rotational position of the fuel cartridge with respect to the fuel cell at a time of mounting the fuel cartridge on the fuel cell, and a concentration distinguishing member for distinguishing a methanol concentration of the methanol solution fuel contained in the container,
   providing a second fuel cartridge comprising container for containing a methanol solution fuel of a predetermined concentration cartridge different from the methanol solution fuel concentration of the first fuel cartridge, a connector having a predetermined shape the same as the predetermined shape of the connector of the first fuel cartridge provided at an outer face of the container for coupling the fuel cartridge to the fuel cell, a positioning member provided at the outer face of the container on or near the connector for determining a rotational position of the fuel cartridge with respect to the fuel cell at a time of mounting the fuel cartridge on the fuel cell, and a concentration distinguishing member for distinguishing a methanol concentration of the methanol solution fuel contained in the container,
   providing a fuel cell comprising a coupler having a shape configured to receive the connector of the first or second fuel cartridge, a position fixing member for causing the positioning member of a fuel cartridge to be mounted in a predetermined position and a concentration recognizing member for determining that the fuel supply is allowable when the methanol concentration of the methanol fuel solution is within a predetermined concentration range,
   mounting one of the first and second fuel cartridges on the fuel cell, and
   judging whether the concentration distinguishing member provided on a container of the one of the first and second fuel cartridges is aligned with the concentration judging member whereby the fuel is supplied from the one of the first and second fuel cartridges to the fuel cell or not aligned whereby the fuel is not supplied from the one of the first and second fuel cartridges to the fuel cell.

7. The method of mounting a fuel cartridge on the fuel cell claimed in claim 6, wherein a pin is provided at the fuel cartridge as the positioning member, a hole is provided at the fuel cell as the position fixing member, and the position of the fuel cartridge and the position of the fuel cell are fixed when the pin in inserted into the hole.

8. The method of mounting the fuel cartridge on the fuel cell claimed in claim 6, wherein a projecting member is provided at the fuel cartridge as the concentration distinguishing member, a recess that receives the projecting member is formed at the fuel cell as the concentration recognizing member; when the projecting member is inserted into the recess, the fuel cartridge is mounted on the fuel cell, whereby the fuel is supplied from the fuel cartridge to the fuel cell.

9. The method of mounting the fuel cartridge on the fuel cell claimed in claim 6, wherein the connector of the fuel cartridge is a cylindrically shaped connector at an end of the container, and the positioning member and the concentration distinguishing member are provided on the end of the container radially outside the connector.

10. The method of mounting the fuel cartridge on the fuel cell claimed in claim 9, wherein the coupler of the fuel cell comprises a coupler having a cylindrically shaped through hole for receiving the cylindrically shaped connector at an end of the container, and the position fixing member and concentration recognizing member are provided radially outside the coupler.

11. The fuel cell power system claimed in claim 1, wherein the connector of the fuel cartridge is a cylindrically shaped connector provided at an end of the container, and the positioning member and the concentration distinguishing member are provided on the end of the container radially outside the connector.

12. The fuel cell power system claimed in claim 11, wherein the coupler of the fuel cell has a cylindrically shaped through hole for receiving the cylindrically shaped connector at an end of the container, and the position determining member and concentration judging member are provided radially outside the coupler.

* * * * *